(12) United States Patent
Teramoto

(10) Patent No.: US 7,507,462 B2
(45) Date of Patent: Mar. 24, 2009

(54) PLASTIC SHEET

(75) Inventor: Kenji Teramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 460 days.

(21) Appl. No.: 11/424,745

(22) Filed: Jun. 16, 2006

(65) Prior Publication Data

US 2007/0014999 A1  Jan. 18, 2007

(30) Foreign Application Priority Data

Jul. 14, 2005  (JP)  ............... 2005-205571

(51) Int. Cl.
*B32B 3/10* (2006.01)
(52) U.S. Cl. .................. 428/134; 428/120; 428/131; 428/174
(58) Field of Classification Search ........... 428/43, 428/81, 119, 120, 131, 132, 134, 136, 174, 428/181, 542.8
See application file for complete search history.

(56) References Cited

U.S. PATENT DOCUMENTS

| 2,985,075 | A * | 5/1961 | Knutsson-Hall | ............. 493/274 |
| 6,391,424 | B1 * | 5/2002 | Suzuki | ....................... 428/167 |
| 2003/0037586 | A1 * | 2/2003 | Durney et al. | .............. 72/379.2 |

FOREIGN PATENT DOCUMENTS

| JP | 3049260 | 3/1998 |
| JP | 2005-47590 | 2/2005 |

* cited by examiner

*Primary Examiner*—Donald Loney
(74) *Attorney, Agent, or Firm*—Oblon, Spivak, McClelland, Maier & Neustadt, P.C.

(57) ABSTRACT

A plastic sheet that includes a first surface and a second surface, which intersect with each other on an imaginary line. The first surface and the second surface have a first straight line and a second straight line, respectively. A first line segment connecting an end of a cutout portion, which is provided on the second line, to an end opposite to the other end of a cutout part, which is provided on the first line, is orthogonal to the imaginary line.

3 Claims, 3 Drawing Sheets

PLASTIC SHEET

BACKGROUND OF THE INVENTION

1. Field of the Invention

The present invention relates to a plastic sheet having a folded sheet.

2. Description of the Related Art

A related art plastic sheet, for example, a reflector of a sidelight-type backlight unit is configured to be half-blanked or is perforated and half-blanked on a borderline between a surface of a part thereof, which part corresponds to the bottom surface of a light guide plate, and a surface of another part thereof, which part substantially corresponds to a side-surface of the light guide plate, which side-surface does not face a lamp (for instance, see Japanese Utility Model Registration No. 3049260 (page 4, and FIG. 1)) to thereby facilitate the bending of the reflector.

According to the aforementioned related art, a half blanking line or a perforation/half-blanking line is formed in a straight line on the borderline. However, when the reflector is folded on the border line, a restoring force is going to restore the reflector. Therefore, the related art reflector has a problem in that it is difficult for the reflector to maintain a folded state.

Also, the reflector is not only used singly as a plastic sheet but used by being incorporated into the backlight unit. Thus, in a case where the folded state is not maintained, incorporating workability is degraded.

Although the reflector can be fixed by providing an adhesive layer thereon to surely maintain the folded state, the reflector has problems in that deterioration in quality of the backlight is caused due to foreign matters adhering to the adhesive layer, and that the number of component members and the number of steps of a manufacturing process increase, because of the necessity of a step of providing the adhesive layer thereon.

SUMMARY OF THE INVENTION

The invention is accomplished in view of the aforementioned problems. Accordingly, an object of the invention is to enhance the quality of products and the workability by maintaining the folded state of a plastic sheet without increasing the number of component members and the number of steps of the manufacturing process thereof.

According to an aspect of the present invention, a plastic sheet includes: a first surface; and a second surface that is not provided on a same plane as the first surface. The first surface and the second surface are joined with each other on an imaginary line. Each of a first straight line and a second straight line, which are parallel to and equally spaced from the imaginary line, has a plurality of cutout portions. A projection of each of the cutout portions provided on the first straight line, on the second straight line is placed between adjacent cutout portions provided on the second straight line, and a projection of each of the cutout portions provided on the second straight line, on the first straight line is placed between adjacent cutout portions provided on the first straight line. A first line segment connecting a second end opposite to a first end of a first cutout portion provided on the first straight line to a first end of a first cutout portion provided on the second straight line, a second line segment connecting a first end of a second cutout portion provided on the first straight line, which adjoins the second end of the first cutout portion provided on the first straight line, to a second end of the first cutout portion provided on the second straight line, and a third line segment connecting a second end of the second cutout portion provided on the first straight line to a first end of a second cutout portion of the second straight line, which adjoins the second end of the first cutout portion provided on the second straight line, are orthogonal to the imaginary line.

According to the invention, a first surface of the plastic sheet and a second surface of the plastic sheet, which is not provided on a same plane as the first surface, are joined with each other on an imaginary line. Each of the first straight line and the second straight line, which are parallel to and equally spaced from the imaginary line, has a plurality of cutout portions. A projection of each of the cutout portions provided on the first straight line, on the second straight line is placed between adjacent cutout portions of the second straight line. A projection of each of the cutout portions provided on the second straight line, on the first straight line is placed between adjacent cutout portions of the first straight line. The cutout portions are formed so that a line segment connecting a second end opposite to a first end of the cutout portion provided on the first straight line to a first end of the cutout portion provided on the second straight line is orthogonal to the imaginary line. Thus, a folded state of a plastic sheet can be maintained without increasing the number of components of the plastic sheet and the number of steps of a manufacturing method of the plastic sheet.

DETAILED DESCRIPTION OF THE INVENTION

Hereinafter, embodiments, to which the invention can be applied, are described. The following description describes the embodiments of the invention. However, the invention is not limited to the following embodiments. Also, to clarify the description, appropriate omission and simplification are made in the following description. It is apparent to those skilled in the art that each of components of the following embodiments can easily be altered, added and converted within the scope of the invention.

First Embodiment

Figure 1:
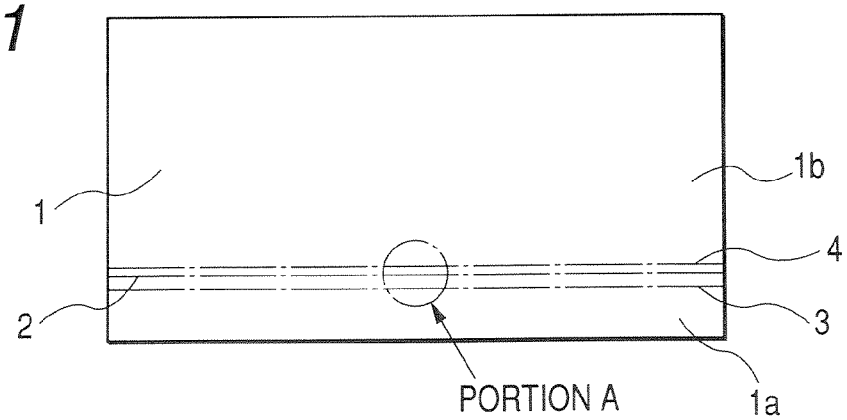
FIG. 1 is a development view illustrating a plastic sheet according to an embodiment of the invention.
Figure 2:
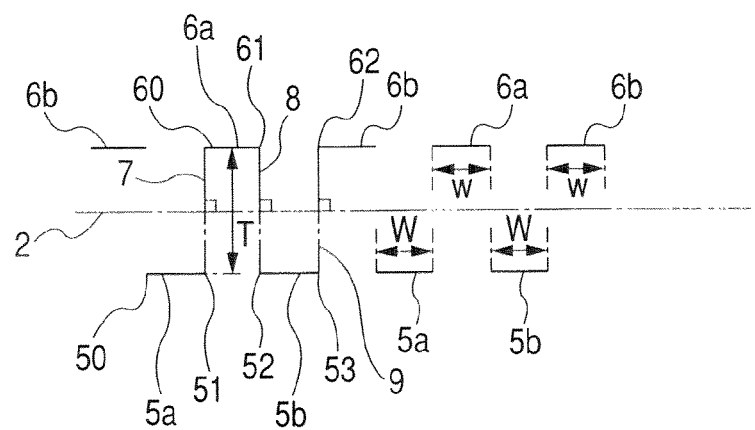
FIG. 2 is an enlarged view illustrating a part A of the embodiment of the invention shown in FIG. 1.
Figure 3:
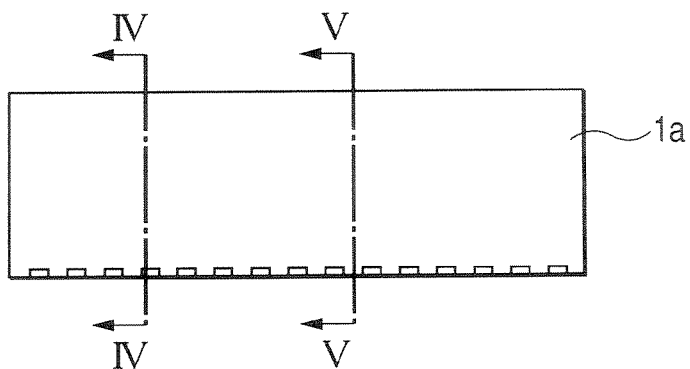
FIG. 3 is a side view illustrating a folded state of the plastic sheet according to the embodiment of the invention.
Figure 4:
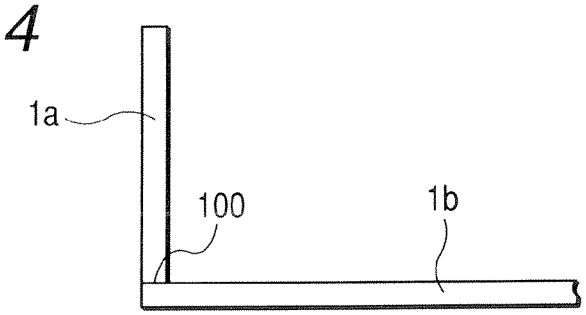
FIG. 4 is a cross-sectional view taken on line IV-IV in the direction of an arrow shown in FIG. 3.
Figure 5:
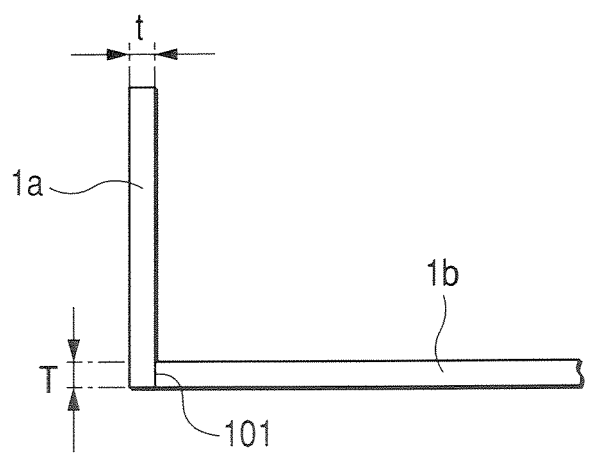
FIG. 5 is a cross-sectional view taken on line V-V in the direction of an arrow shown in FIG. 3.

FIG. 1 is a development view illustrating a plastic sheet according to an embodiment of the invention. FIG. 2 is an enlarged view illustrating a part A of the embodiment of the invention shown in FIG. 1. FIG. 3 is a side view illustrating a folded state of the plastic sheet according to the embodiment of the invention. FIG. 4 is a cross-sectional view taken on line IV-IV in the direction of an arrow shown in FIG. 3. FIG. 5 is a cross-sectional view taken on line V-V in the direction of an arrow shown in FIG. 3.

As illustrated in FIGS. 1 and 2, a plastic sheet 1 includes a first surface 1a and at least one second surface 1b, which is not present on the same plane as that on which the first surface 1a is present. The first surface 1a and the second surface 1b are joined with each other on an imaginary line 2 that is a guide line along which the first surface 1a of the plastic sheet is folded. Generally, the material of the plastic sheet 1 is PET (polyethylene terephthalate) but is not limited thereto.

Also, a first straight line 3 and a second straight line 4 are provided on the first surface 1a and the second surface 1b, respectively, and extend in parallel to this imaginary line 2 so that the distance between the lines 2 and 3 is equal to the distance between the lines 2 and 4. First cutout portions 5a and second cutout portions 5b, which are provided on the first straight line 3, and first cutout portions 6a and second cutout portions 6b, which are provided on the second straight line 4, are alternately provided.

The projection of the first cutout portion 5a, which is provided on the first straight line 3, on the second straight line 4 is positioned between the second cutout portion 6b and the first cutout portion 6a, which are provided on the second straight line 4. The projection of the second cutout portion 5b, which is provided on the first straight line 3, on the second straight line 4 is positioned between the first cutout portion 6a and the second cutout portion 6b, which are provided on the second straight line 4.

The projection of the first cutout portion 6a, which is provided on the second straight line 4, on the first straight line 3 is positioned between the first cutout portion 5a and the second cutout portion 5b, which are provided on the first straight line 3. The projection of the second cutout portion 6b, which is provided on the second straight line 4, on the first straight line 3 is positioned between the second cutout portion 5b and the first cutout portion 5a, which are provided on the first straight line 3.

Also, the cutout portions are configured so that a first line segment 7 connecting a second end 51 opposite to a first end 50 of the first cutout portion 5a provided on the first straight line 3 to a first end 60 of the first cutout portion 6a provided on the second straight line 4, a second line segment 8 connecting a first end 52 of the second cutout portion 5b provided on the first straight line 3, which adjoins the second end 51 of the first cutout portion 5a provided on the first straight line 3, to a second end 61 of the first cutout portion 6a provided on the second straight line 4, and a third line segment 9 connecting a second end 53 of the second cutout portion 5b provided on the first straight line 3 to a first end 62 of the second cutout portion 6b provided on the second straight line 4, which adjoins the second end 61 of the first cutout portion 6a provided on the second straight line 4, are orthogonal to the imaginary line 2 serving as a guide line along which the first surface 1a of the plastic sheet 1 is folded.

Incidentally, projections of the first cutout portion 5a and the second cutout portion 5b, which are provided on the first straight line 3, on the second straight line 4 and the first cutout portion 6a and the second cutout portion 6b provided on the second straight line 4 are alternately and consecutively arranged on the second straight line 4. Although not shown, a plurality of line segments are orthogonal to the imaginary line 2.

With such a configuration, as illustrated in FIGS. 3 to 5, when the first surface 1a of the plastic sheet 1 is folded, the first surface 1a is stranded on a side surface 101 of the second surface 1b. The second surface 1b is stranded on a side surface 100 of the first surface 1a. A force applied by the side surface 100 of the first surface 1a to the second surface 1b and a force applied by the side surface 101 of the second surface 1b to the first surface 1a impede a force of restoring the plastic sheet 1, so that a folded state of the plastic sheet 1 can be maintained.

Let W denote the length of each of the first cutout portion 5a and the second cutout portion 5b provided on the first straight line 3. Also, let w designate the length of each of the first cutout portion 6a and the second cutout portion 6b provided on the second straight line 4. Preferably, W=w Thus, in a case where W=w, the force applied by the side surface 100 of the first surface 1a to the second surface 1b is substantially equal to the force applied by the side surface 101 of the second surface 1b to the first surface 1a. Consequently, the folded state of the plastic sheet 1 can more surely be maintained.

Let T denote the length of the first line segment 7 connecting the second end 51 opposite to the first end 50 of the first cutout portion 5a provided on the first straight line 3 to the first end 60 of the first cutout portion 6a provided on the second straight line 4. Also, let t designates the thickness of the plastic sheet 1. Preferably, T=t. Thus, in a case where T=t, the folded state of the plastic sheet 1 can be stabilized.

According to this embodiment, the first straight line 3 is provided on the first surface 1a of the plastic sheet 1, and the second straight line 4 is provided on the second surface 1b of the plastic sheet 1. However, even in a case where the first straight line 3 is provided on the second surface 1b and where the second line 4 is provided on the first surface 1a, similar advantages can be obtained.

The shapes and the numbers of the first cutout portions 5a and the second cutout portions 5b provided on the first straight line 3 and the first cutout portions 6a and the second cutout portions 6b provided on the second straight line 4 are appropriately optimized according to the material and the thickness of the plastic sheet 1.

Next, a reflection sheet, which serves as a plastic sheet 1 to be used by being incorporated into a backlight unit, is described by referring to FIGS. 6 to 9.

Figure 6:
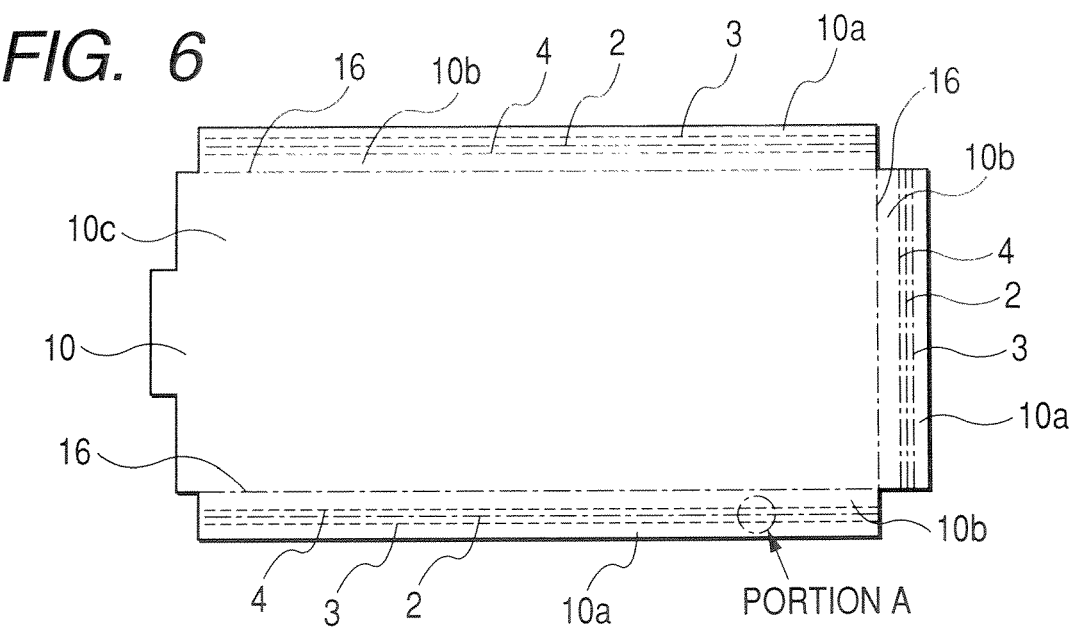
FIG. 6 is a development view illustrating a reflection sheet according to another embodiment of the invention.
Figure 7:
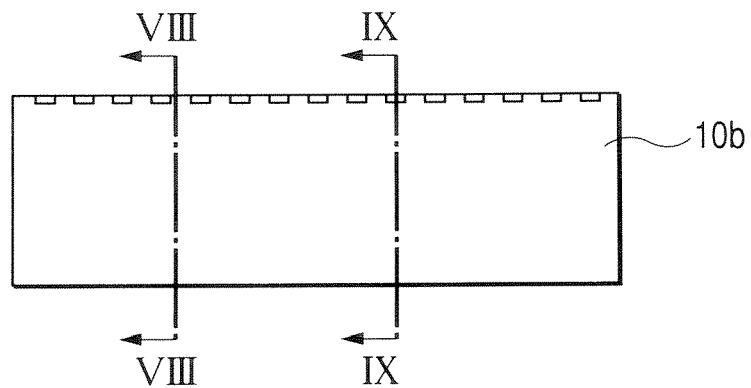
FIG. 7 is a side view illustrating a folded state of the reflection sheet according to the embodiment of the invention.
Figure 8:
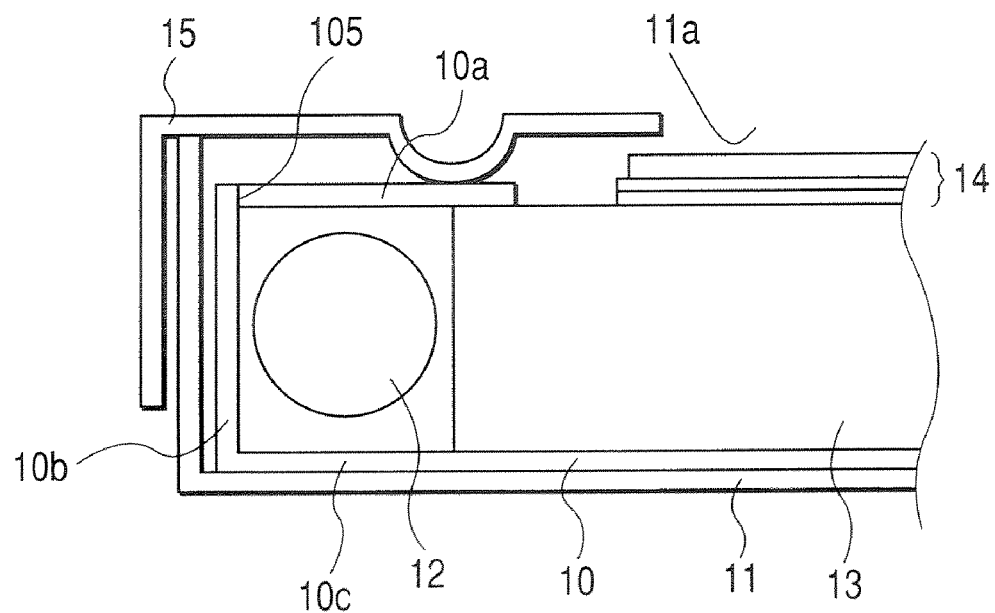
FIG. 8 is a cross-sectional view, taken on line VIII-VIII in the direction of an arrow shown in FIG. 7, illustrating the reflection sheet according to the embodiment of the invention, which is incorporated into a backlight unit.
Figure 9:
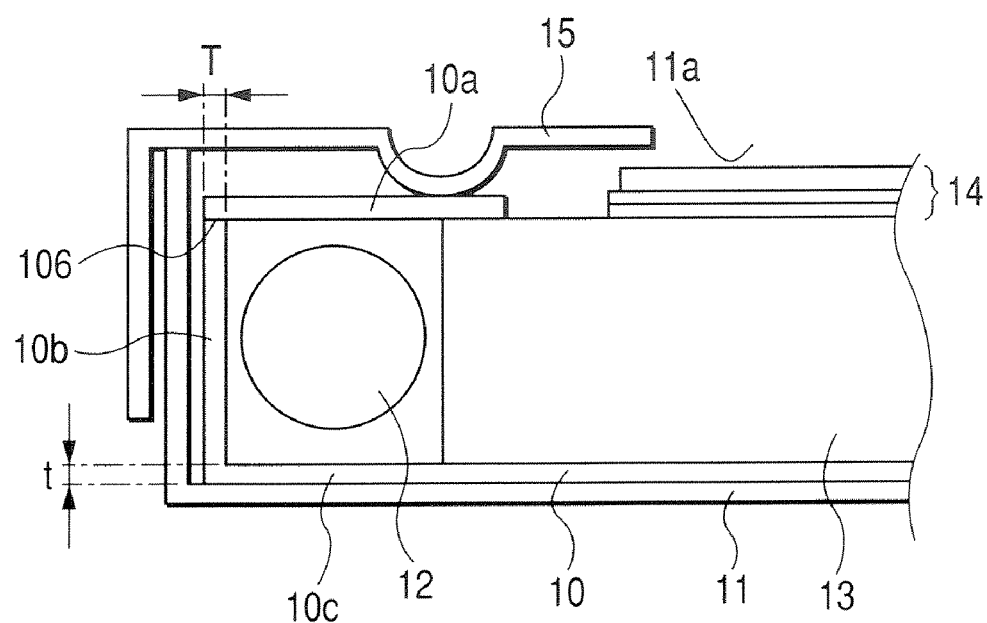
FIG. 9 is a cross-sectional view, taken on line IX-IX in the direction of an arrow shown in FIG. 7, illustrating the reflection sheet according to the embodiment of the invention, which is incorporated into the backlight unit.

FIG. 6 is a development view illustrating the reflection sheet according to this embodiment of the invention. FIG. 7 is a side view illustrating a folded state of the reflection sheet according to this embodiment of the invention. FIG. 8 is a cross-sectional view, taken on line VIII-VIII in the direction of an arrow shown in FIG. 7, illustrating the reflection sheet according to this embodiment of the invention, which is incorporated into the backlight unit. FIG. 9 is a cross-sectional view, taken on line IX-IX in the direction of an arrow shown in FIG. 7, illustrating the reflection sheet according to this embodiment of the invention, which is incorporated into the backlight unit. In FIGS. 6 to 9, the same reference numerals as those used in FIGS. 1 to 5 designate the same or corresponding components shown in FIGS. 1 to 5.

The reflection sheet 10 serving as the plastic sheet 1, as shown in FIGS. 6, 7, and 2, includes the first surface 10a and the second surface 10b that is not present on the same plane on which the first surface 1a is present. The first surface 10a and the second surface 10b are joined with each other on the imaginary line 2 that serves a guide line along which the first surface 10a of the plastic sheet 1 is folded.

The first straight line 3 and the second straight line 4, which extend in parallel to the imaginary line 2 so that the distance between the lines 2 and 3 is equal to the distance between the lines 2 and 4, are provided on the first surface 10a and the second surface 10b, respectively.

In a case where the reflection sheet 10 is incorporated into the backlight unit, the reflection sheet 10 is disposed in a first casing 11, as illustrated in FIGS. 8 and 9, so that reflection light travels to an opening portion 11a. A light source 12 is disposed in a gap formed by folding the reflection sheet 10. To efficiently reflect light, the reflection sheet 10 is configured by applying an evaporated alumina layer or a white coating to a PET (polyethylene terephthalate) film. The thickness of the reflection sheet is usually 0.2 mm. However, the thickness of the reflection sheet is not limited thereto.

Also, a light guide plate 13 adapted to guide light outputted from the light source 12 to the opening portion 11a and to diffuse the light is disposed at the side of the opening portion 11a of the reflection sheet 10 in the casing 11. A group of a plurality of optical sheets 14 is disposed at the side of the opening portion 11a of the light guide plate 13 so as to effectively utilize light.

Also, this embodiment has a second casing 15 that serves as a counterpart of the first casing 11 and that externally grasps a side surface of the first casing 11.

With such a configuration of cutout portions, when the first surface 10a of the reflection sheet 10 is folded, the first surface 10a of the reflection sheet 10 is stranded on a side surface 106 of the second surface 10b. The second surface 10b is stranded on a side surface 105 of the first surface 10a. A force applied by the side surface 105 of the first surface 10a to the second surface 10b and a force applied by the side surface 106 of the second surface 10b to the first surface 10a impede a force of restoring the reflection sheet 10, so that a folded state of the reflection sheet 10 can be maintained.

Because the reflection sheet 10 is used by being incorporated into the backlight unit, the incorporating workability can be enhanced by maintaining the folded state of the reflection sheet 10.

Let W (mm) denote the length of each of the first cutout portion 5a and the second cutout portion 5b provided on the first straight line 3. Also, let w (mm) designate the length of each of the first cutout portion 6a and the second cutout portion 6b provided on the second straight line 4. Preferably, W=w. Thus, in a case where W=w, the force applied by the side surface 105 of the first surface 10a to the second surface 10b is substantially equal to the force applied by the side surface 106 of the second surface 10b to the first surface 10a. Consequently, the folded state of the reflection sheet 10 can more surely be maintained.

Let T (mm) denote the length of the first line segment 7 connecting the second end 51 opposite to the first end 50 of the first cutout portion 5a provided on the first straight line 3 to the first end 60 of the first cutout portion 6a provided on the second straight line 4. Also, let t (mm) designates the thickness of the reflection sheet 10. Preferably, T=t. Thus, in a case where T=t, the folded state of the reflection sheet 10 can be stabilized.

According to this embodiment, the first straight line 3 is provided on the first surface 10a of the reflection sheet 10, and the second straight line 4 is provided on the second surface 10b of the reflection sheet 10. However, even in a case where the first straight line 3 is provided on the second surface 10b and where the second line 4 is provided on the first surface 10a, similar advantages can be obtained.

There is no necessity for providing an adhesive layer in a portion, in which the first surface 10a of the reflection sheet 10 and the light guide plate 13 overlap, so as to surely maintain the folded state. Thus, foreign matters can be prevented, without increasing the number of component members and the number of steps of a manufacturing process, from adhering to the reflection sheet through the adhesive layer. Consequently, the quality of products and the workability can be enhanced.

Although this embodiment relates to the shape of the reflection sheet 10, which is obtained by folding the reflection sheet 10 along the imaginary line 2 on which the first surface 10a and the second surface 10b are joined with each other, similar advantages can be obtained even in a case where the invention is applied to the shape of the reflection sheet 10, which is obtained by folding the reflection sheet 10 along an imaginary line 16 on which a bottom surface 10c and the second surface 10b of the reflection sheet 10 are joined with each other.

Although a cold cathode fluorescent lamp (CCFL) is employed as the light source disposed on the side surface of the light guide plate in this embodiment, such a lamp according to the invention is not limited thereto. Similar advantages can be obtained even in a case where a light source using a light emitting diode (LED) having luminescent colors, such as R, G, and B, is employed.

What is claimed is:

1. A plastic sheet comprising:
a first surface; and
a second surface that is not provided on a same plane as the first surface, wherein
the first surface and the second surface are joined with each other on an imaginary line,
each of a first straight line and a second straight line, which are parallel to and equally spaced from the imaginary line, has a plurality of cutout portions,
a projection of each of the cutout portions provided on the first straight line, on the second straight line is placed between adjacent cutout portions provided on the second straight line,
a projection of each of the cutout portions provided on the second straight line, on the first straight line is placed between adjacent cutout portions provided on the first straight line, and
a first line segment connecting a second end opposite to a first end of a first cutout portion provided on the first straight line to a first end of a first cutout portion provided on the second straight line, a second line segment connecting a first end of a second cutout portion provided on the first straight line, which adjoins the second end of the first cutout portion provided on the first straight line, to a second end of the first cutout portion provided on the second straight line, and a third line segment connecting a second end of the second cutout portion provided on the first straight line to a first end of a second cutout portion of the second straight line, which adjoins the second end of the first cutout portion provided on the second straight line, are orthogonal to the imaginary line.

2. The plastic sheet according to claim 1, wherein a length of the cutout portion provided on the first straight line is substantially equal to a length of the cutout portion provided on the second straight line.

3. The plastic sheet according to claim 1, wherein a length of the first line segment is substantially equal to a thickness of the plastic sheet.

* * * * *